United States Patent [19]
Demyanovich

[11] Patent Number: 6,036,864
[45] Date of Patent: Mar. 14, 2000

[54] PROCESS FOR REDUCING WATER CONSUMPTION DURING WET PROCESSING OF TEXTILES

[76] Inventor: Robert J. Demyanovich, 1229 - 20th Ave. #3, San Francisco, Calif. 94122

[21] Appl. No.: 08/777,612

[22] Filed: Dec. 31, 1996

[51] Int. Cl.⁷ .................................................. B01D 61/00
[52] U.S. Cl. ...................... 210/651; 210/650; 210/660; 210/663; 210/767; 210/805; 8/138; 8/141; 134/10
[58] Field of Search .................................... 210/651, 650, 210/767, 805, 639, 717, 660, 663; 8/111, 107, 101, 151, 138, 141; 134/10

[56] References Cited

U.S. PATENT DOCUMENTS

| | | | |
|---|---|---|---|
| 3,947,248 | 3/1976 | Powers | 8/81 |
| 3,969,239 | 7/1976 | Shinohara et al. | |
| 4,005,011 | 1/1977 | Sweeny | |
| 4,045,171 | 8/1977 | Lancy | 210/651 |
| 4,095,947 | 6/1978 | Wolf et al. | 8/138 |
| 4,115,054 | 9/1978 | Hermes | 8/17 |
| 4,200,526 | 4/1980 | Johnson et al. | 210/652 |
| 4,207,184 | 6/1980 | Kaiser et al. | 210/660 |
| 4,333,190 | 6/1982 | Ruettiger et al. | 8/151 |
| 4,604,204 | 8/1986 | Linder et al. | 210/49 |
| 4,758,347 | 7/1988 | Henz et al. | 210/639 |
| 5,360,551 | 11/1994 | Weber | 210/719 |

*Primary Examiner*—Ana Fortuna
*Attorney, Agent, or Firm*—David Pressman

[57] ABSTRACT

An economical process for reducing water consumption and, therefore, water discharge during the dyeing of textile goods is disclosed. Processing baths during dyeing, which can be reused directly or after minimal treatment, are segregated from baths which contain a high level of pollutants and color. The reuse baths are combined and stored separately from baths which are to be discharged. The reuse baths are then recycled directly or after minimal treatment to the dyeing process. Baths containing a high level of pollutants and color are either discharged directly to the local public treatment works or are treated in a conventional wastewater treatment plant. The process results in substantial economic benefits because the operating costs of recycling reuse baths are low and because the quantity of wastewater discharged is substantially reduced.

5 Claims, No Drawings

PROCESS FOR REDUCING WATER CONSUMPTION DURING WET PROCESSING OF TEXTILES

BACKGROUND

1. Field of the Invention

This invention relates to a process for reducing water consumption and, therefore water discharge, during the dyeing of textile products.

2. Description of Prior Art

Water usage at textile mills can generate millions of gallons of dye wastewater daily. The unnecessary usage of water adds substantially to the cost of finished textile products through increased charges for fresh water and for sewer discharge. Additionally, wastewaters from textile dyeing processes impose substantial pollutant loads on downstream publicly owned treatment works due to high levels of color, chemical oxygen demand (COD), biological oxygen demand (BOD) and suspended solids.

Various processes have been utilized to reduce pollutant loadings in textile mill wastewater discharge. These "end-of-pipe" treatment systems treat the mill discharge just prior to discharge to the local sewer system. End-of-pipe treatment systems include flocculation, membrane filtration, chemical oxidation and activated carbon adsorption.

U.S. Pat. No. 3,947,248 to J. B. Powers discloses the use of cationic polymers to flocculate organic compounds in wastewater discharge from textile yarn and fabric manufacturing operations.

U.S. Pat. No. 3,969,239 to I. Shinohara et al. discloses the use of a macroamine polymer as the sole flocculating agent for clarifying and decolorizing wastewater.

U.S. Pat. No. 4,005,011 to C. D. Sweeney discloses a process for purifying wastewater effluent generated during the manufacture of dyestuffs. The process employs lime to remove heavy metals from the wastewater, followed by carbon adsorption and secondary biological treatment.

U.S. Pat. No. 4,758,347 to A. Henz et al. discloses a method for purifying/decolorizing dyeing wastewaters using a membrane separation process.

U.S. Pat. No. 5,366,551 to O. W. Weber discloses a process tor decolorizing dye wastewater which first acidifies the wastewater, then adds a cationic flocculating agent followed by a reducing agent.

Many of the afore-mentioned processes can effectively treat and recycle a portion of the wastewater effluent discharged from textile mills. However, the capital and operating costs of these systems are high. The use of large quantities of chemicals or the use of membranes, which foul easily, leads to operating costs that in many cases exceed the savings in reduced water and sewer discharge costs. In spite of environmental regulations the implementation of wastewater treatment systems at many textile mills is solely an economic decision. In many areas, the local textile mill can threaten to relocate to a region with looser regulations resulting in a loss of jobs to the region.

OBJECT AND ADVANTAGES

This invention provides a simple, efficient, and cost-effective process for conserving water during the dyeing of textile greige goods. Wastewater from the various baths employed during pretreatment and dyeing of greige goods is segregated. Baths that are relatively clean are combined and reused in the pretreatment and/or dyeing process either directly or after minimal treatment. Baths that are highly colored, or contain high levels of COD, BOD and other pollutants are combined and either discharged directly or treated further. The process can be used at textile mills employing either batch or continuous dyeing of greige goods.

It is one object of the present invention to provide a process for conserving water during the pretreatment and dyeing of greige goods. A reduction in water usage during the textile dyeing process results in decreased fresh water and sewer discharge costs.

It is another object of the present invention to provide a process for conserving water during the pretreatment and dyeing of greige goods that has reduced capital and operating costs when compared with end-of-pipe treatment systems.

It is also an object of the present invention to reduce the amount of wastewater that is discharged or requires further treatment before discharge. The capital costs of expensive end-of-pipe treatment systems are directly proportional to the wastewater flow rate. Any reduction in wastewater flow rate results in a similar reduction in the capital cost of an end-of-pipe treatment system.

DESCRIPTION

Dyeing of greige goods includes pretreatment cycles, at least one dyeing cycle, and post-dyeing cycles. A preferred method for conserving water during the dyeing process is comprised of the following steps:

a) segregating cycles which can be reused either directly or after minimal treatment (reuse cycles) from cycles which contain a high level of color, COD, and/or BOD (discharge cycles).

b) combining and storing the reuse cycles c) combining, and storing the discharge cycles d) recycling the reuse water directly or after minimal treatment to the dyeing process e) discharging the discharge water either directly or after treatment required by the local POTW or other sewer discharge regulating agency.

In process step a), effluent from the dyeing cycles, which is to be reused, is segregated from effluent that is to be discharged. To accomplish segregation of these cycles, the dye machine can he outfitted with two or more drain valves. Effluent can then be directed to a pipe, conduit, open trench or other suitable flow channel for downstream collection. To prevent subsequent contamination of the reuse cycles, an enclosed flow channel, such as a pipe or enclosed trench, for the reuse cycles is preferred.

The cycles to be reused depend on the operations of the textile mill. Commission textile dyeing, operations, which dye many different fabrics many different colors depending on the requirements of the customer, will typically be able to save rinse cycles after bleaching, acid cycles prior to dyeing, fixation cycles, and any final rinses designed to test the colorfastness of the fabric. In addition, some rinse cycles after dyeing, may be saved for reuse; however, this will depend upon the class and color of the dye. The class of dyes known as reactive dyes may allow for reuse of rinse cycles (after soaping) because the dye is chemically bonded to the fabric. Rinse cycles after light color dyeing may also qualify for reuse because of the very low level of residual dye and color.

Dye baths containing high levels of color, COD, BOD, and/or other contaminants are segregated from reuse baths.

For dye machines outfitted with two or more drain valves, these contaminated baths are directed through a valve to a suitable flow channel that is separate from the valve used to direct the reuse baths. The flow channel for the contaminated effluent is also separate from the flow channel for the reuse water. Because this contaminated water will not be reused, however, the flow channel need not be enclosed and can be an open trench: a flow conduit that commonly exists in textile dyeing mills.

The contaminated cycles to be discharged depend on the operations of the textile mill. Since one of the objects of the present invention is to provide a cost-effective process for reusing water, cycles which contain a high, level of color, COD, BOD and/or other contaminants, should be directed to the flow conduit containing wastewater tor eventual discharge. These cycles typically include scouring and mercerizing cycles, dye cycles, some rinses after dyeing and fixing cycles tor dark colors. Bleach cycles for cellulosic fibers such as cotton will typically also be discharged due to the high COD and BOD content.

In process step b), the baths that are directed to the reuse flow conduit are collected in a common storage facility, such as a storage basin or storage tank. The storage facility should be enclosed so that inadvertent contamination of the reuse water is precluded.

In process step c) the contaminated baths that are directed to the discharge flow conduit are collected in a common storage facility, such as a storage basin or storage tank. The storage facility need not be enclosed. For textile mills which have a single open basin for storing wastewater, containment costs can be reduced by splitting the basin by means of a containment wall. Reuse water can be stored on one side of the basin and contaminated water on the other side.

In process step d) the reuse water is eventually reused in the dyeing process. A preferred method for recycling this reuse water includes:

1. filtering the reuse water with a multimedia filter to reduce the level of suspended solids.
2. replacing a portion or all of the plant cooling water with reuse water.
3. storing the warm cooling water in a tank for direct use as hot water by the dyeing process.

Whether or not all of these steps are employed when recycling the reuse water depends on the operation of the textile mill. For example, textile mills which only dye synthetic fabric such as nylon and polyester may not require filtration of the reuse water prior to recycle. Synthetic fibers typically leave much lower levels of suspended solids in spent bath water when compared with cellulosic fibers such as cotton.

Use of the reuse water as cooling water depends on the overall heat balance of the textile mill, the dyeing processes employed, and the cycles which will employ reuse water. Many textile mill dyeing operations currently store spent, warm, but uncontaminated cooling water for use in the dyeing process. If reuse water is to be used for hot scouring and bleaching cycles, then employing reuse water as dye machine cooling water is preferred. Two major advantages result from this preferred embodiment: heating requirements are reduced, and existing feed water piping to the dye machines can be used. Most dye machines have hot and cold water inlets, but may not have a reuse water inlet. By employing the reuse water as cooling water, which itself is employed as hot water to the dyeing process, the cost of installing reuse water feed lines to the dye machines can be avoided.

The preferred embodiment of the present invention recycles reuse water to baths that, when discharged from the dye machine, are directed to the discharge flow conduit. Recycling the reuse water in this fashion prevents the buildup of salts and trace contaminants in the reuse water, which could adversely affect the dyeing process. It is not necessary that all of the reuse water be used for baths which will be eventually discharged to the sewer. To preclude salt and trace contaminant buildup, however, a certain portion of the reuse water must be used as feed water to dye baths that will be discharged to the sewer.

In process step e), contaminated baths collected in the discharge flow conduit and stored, if required, is discharged either directly or after treatment to the sewer system. If treatment is required, the capital costs of this treatment are substantially reduced because the quantity of water discharged is reduced by the quantity of water reused. Since capital costs of end-of-pipe treatment systems vary directly with flowrate, the capital outlay for the discharge water treatment system is substantially reduced.

To further reduce plant operating costs, other methods of heat recovery can be implemented as part of the process of the present invention. In addition to use of warm reuse water (which supplants cold, fresh water), heat can be transferred to incoming cold, fresh water from warm discharge wastewater. Many dyehouses actually prefer "cold" water at a temperature of 90 to 100° F., instead of 60 to 70° F. The addition of stack economizers to boiler stacks can also reduce plant natural gas requirements. Hot process water can be recirculated through the stack economizers to recover stack gas heat.

While the above description contains many specificities, these should not be construed as limitations on the scope of the invention, but rather as an exemplification of a preferred embodiment thereof. Other variations are possible, and these are obvious to those skilled in the art based on the principles discussed in the description.

The following example shall serve to illustrate the practice of the present invention. It should be understood that the information disclosed serves only as an example and is not intended to limit the scope of the invention. Accordingly, the scope of the invention should be determined not by the embodiment and examples illustrated, but by the appended claims and their legal equivalents.

EXAMPLE

Implementation of the Present Invention at a Typical Dyehouse

A commission batch dyeing operation uses approximately 500,000 gallons/day of water to dye knit fabrics made of cotton, cotton-polyester blends, and synthetics (nylon, polyester, acetate, etc.) in twenty dye machines. Spent, warm, cooling water used by the dye machines to cool the dye cycles and bleaching cycles is stored and reused as hot water for various dyeing cycles. Bath water is discharged from the machines into a single open trench which directs the wastewater to a 20,000 gallon outside sump. Since the plant is restricted to discharging a uniform rate of wastewater, equalization tanks are provided to dampen peak flows resulting from the on-demand dyeing operation.

This existing dyeing operation is modified using a preferred embodiment of the present invention. An additional drain valve is installed on each dyeing machine. A pipe is laid in the trench and one drain valve from each machine is connected to the pipe. The existing outside sump is split into two sections by a retaining wall. The two rinses after bleaching and the final dye rinse are to be saved as reuse water. Reuse water directed to the pipe will be sent to one side of the split sump, whereas contaminated water will flow in the open trench to the other side of the split sump. Since cellulosic fibers are dyed, removal of suspended solids from the reuse water is recommended. Reuse water is directed to a multimedia filter for suspended solids removal and is then stored in one of the equalization tanks. From this equalization tank the reuse water with a temperature of about 100° F. is reused as cooling water by the dye machines. The cooling water removes heat from the baths that are greater than 160° F. in temperature so that they can be discharged at 120 to 160° F. Since the quantity of reuse water available is greater than the quantity of cooling water required (i.e. without the present invention), the higher incoming temperature of the reuse water does not limit the amount of heat removal. This reuse cooling water is heated to about 120° F. and collected in the existing hot water tank. The reuse water is then directly recycled to the dye machines as hot water for scouring bleaching, and hot rinses. Using the reuse water as cooling water and thereafter hot water, precludes the need to install a reuse feed water line to each dye machine, resulting in substantial savings in valves and piping. In addition to water conservation additional energy is conserved by recovering heat from the wastewater and from the boiler stack gases. A heat exchanger is installed that transfers heat from the discharge wastewater to a portion of the incoming fresh water. Stack economizers are installed on boiler stacks to further heat hot process water.

Implementing the process of the present invention is projected to result in a 35% savings in fresh water, 35% savings in sewer costs, and a 20% reduction in natural gas consumption. The only operating costs associated with the process, in the above example, are the costs associated with the periodic maintenance of equipment such as pumps. There are no chemical costs, membrane replacement costs, additional solids disposal costs, etc. Although the simple payback period is a function of the unit costs of water, sewer discharge and natural gas, the simple payback for the process of the present invention is often less than half the estimated simple payback tor end-of-pipe treatment systems.

I claim:

1. A process for reducing water consumption and water discharge during the dyeing and printing of textiles in a dyeing apparatus having a plurality of baths selected from the group consisting of scouring, mercerizing, bleaching, pretreatment rinse, dyeing, post-dyeing rinse, soaping, and finishing baths, wherein each of said plurality of baths is discharged from said dyeing apparatus and wherein at least one of said plurality of baths has relatively low pollutant loadings and at least one has relatively high pollutant loadings, comprising:

a) during said discharge of each of said plurality of baths from said dyeing apparatus, segregating those of said baths containing said relatively low pollutant loadings from those of said baths containing said relatively high pollutant loadings by discharging those of said baths containing said relatively low pollutant loadings into an enclosed first flow channel and discharging those of said baths containing said relatively high pollutant loadings into a second flow channel, which is separate from said first flow channel, b) causing those of said baths containing said relatively low pollutant loadings which flow in said enclosed first flow channel to be conducted to a storage receptacle, c) causing those of said baths containing said relatively low pollutant loadings to flow from said storage receptacle, without treatment with chemical segregating agents, in a third flow channel to said dyeing apparatus for use as water in a textile dyeing process, and d) causing those of said baths containing said relatively high pollutant loadings which flow in said second flow channel to be conducted to a wastewater discharge system.

2. A process for reducing water consumption and water discharge during the dyeing and printing of textiles in a dyeing apparatus having a plurality of baths selected from the group consisting of scouring, mercerizing, bleaching, pretreatment rinse, dyeing, post-dyeing rinse, soaping, and finishing baths, wherein each of said plurality of baths is discharged from said dyeing apparatus and wherein at least one of said plurality of baths has relatively low pollutant loadings and at least one has relatively high pollutant loadings, comprising the steps of:

a) during said discharge of each of said plurality of baths from said dyeing apparatus, segregating those of said baths containing said relatively low pollutant loadings from those of said baths containing said relatively high pollutant loadings by discharging those of said baths containing said relatively low pollutant loadings into an enclosed first flow channel and discharging those of said baths containing said relatively high pollutant loadings into a second flow channel, which is separate from said first flow channel, b) causing those of said baths containing said relatively low pollutant loadings which flow in said enclosed first flow channel to be conducted to a storage receptacle, c) causing those of said baths containing said relatively low pollutant loadings to flow from said storage receptacle, without treatment with chemical segregating agents, in a third flow channel to a device for filtering those of said baths containing said relatively low pollutant loadings to reduce further said relatively low pollutant loadings, thereby producing filtered baths containing a relatively lower pollutant loading, d) causing those of said filtered baths containing said relatively lower pollutant loading to flow from said filtering device in a fourth flow channel to a second storage receptacle, e) causing those of said filtered baths containing said relatively lower pollutant loading to flow from said second storage receptacle in a fifth flow channel to said dyeing apparatus for use as water in a textile dyeing process, and f) causing those of said baths containing said relatively high pollutant loadings which flow in said second flow channel to be conducted to a wastewater discharge system.

3. A process according to claim 1 wherein said filtering device is a multimedia filter.

4. A process according to claim 1 wherein said filtering device employs membrane filtration.

5. A process For reducing water consumption and water discharge during the dyeing and printing of textiles in a dyeing apparatus having a plurality of baths selected from the group consisting of scouring, mercerizing, bleaching, pretreatment rinse, dyeing, post-dyeing rinse, soaping, and finishing baths, wherein each of said plurality of baths is discharged from said dyeing apparatus and wherein at least one of said plurality of baths has relatively low pollutant loadings and at least one has relatively high pollutant loadings, comprising the steps of:

a) during said discharge of each of said plurality of baths from said dyeing apparatus, segregating those of said baths containing said relatively low pollutant loadings from those of said baths containing said relatively high pollutant loadings by discharging those of said baths containing said relatively low pollutant loadings into an enclosed first flow channel and discharging those of said baths containing said relatively high pollutant loadings into a second flow channel, which is separate from said first flow channel, b) causing those of said baths containing said relatively low pollutant loadings which flow in said enclosed first flow channel to be conducted to a storage receptacle, c) causing those of said baths containing said relatively low pollutant loadings to flow from said storage receptacle in a third flow channel to a device for filtering those of said baths containing said relatively low pollutant loadings to reduce further said relatively low pollutant loadings, thereby producing filtered baths containing a relatively lower pollutant loading, d) causing those of said filtered baths containing said relatively lower pollutant loading to flow from said filtering device in a fourth flow channel to a second storage receptacle, e) causing those of said filtered baths containing said relatively lower pollutant loading to flow from said second storage receptacle in a fifth flow channel to a heat exchanger of said dyeing apparatus for removal of heat from said dyeing apparatus, f) causing those of said filtered baths containing said relatively lower pollutant loading to flow from said heat exchanger of said dyeing apparatus in a sixth flow channel to a third storage receptacle, g) causing those of said filtered baths containing said relatively lower pollutant loading to flow from said third storage receptacle in a seventh flow channel to said dyeing apparatus for use as water in a textile dyeing process, and h) causing those of said baths containing said relatively high pollutant loadings which flow in said second flow channel to be conducted to a wastewater discharge system.

* * * * *